United States Patent [19]

Fowler

[11] 3,818,132

[45] June 18, 1974

[54] COLLIMATED LIGHT SOURCE SCANNER SYSTEMS

[75] Inventor: Raymond L. Fowler, Lexington, Ky.

[73] Assignee: International Business Machines Corporation, Armonk, N.Y.

[22] Filed: Oct. 3, 1972

[21] Appl. No.: 294,748

[52] U.S. Cl. .................................................. 178/7.6
[51] Int. Cl. ............................................. H04n 3/02
[58] Field of Search ....................... 128/7.6; 350/6, 7

[56] References Cited

UNITED STATES PATENTS

| | | | |
|---|---|---|---|
| 2,976,361 | 3/1961 | Stamps | 178/7.6 |
| 2,976,362 | 3/1961 | Stamps | 178/7.6 |
| 3,441,668 | 4/1969 | Townsend | 178/7.6 |
| 3,487,224 | 12/1969 | Berkmann | 178/7.6 |

OTHER PUBLICATIONS

McMurtry – Laser Raster Scanner With Separated Incident and Reflected Beams – IBM Tech. Disc. Bull, Vol. 14, No. 8, Jan. 1972–pp. 2460–2461.

*Primary Examiner*—Richard Murray
*Attorney, Agent, or Firm*—D. Kendall Cooper

[57] ABSTRACT

A variety of scanner systems are described making use of a collimated light source such as a laser source with the primary objective of scanning information by successive line scans.

6 Claims, 17 Drawing Figures

COLLIMATED LIGHT SOURCE SCANNER SYSTEMS

BACKGROUND OF THE INVENTION AND PRIOR ART

Many types of scanners have been proposed in the prior art for scanning material, such as original documents, in order to develop signals for transmission, printing, or copying purposes. Prior scanners include wedge scanners, multi-facet scanners, helical scanners, etc. Representative of the prior art are the following materials:

U.S. Pat. No. 1,647,631, issued Nov. 1, 1927, entitled "Optical System," and having H. E. Ives, as inventor.

U.S. Pat. application Ser. No. 190,024 filed Oct. 18, 1971, now U.S. Pat. No. 3,750,189 entitled "Improved Light Scanning and Printing System," having John M. Fleischer, as inventor and assigned to the same assignee as the present invention.

Article, entitled "Rotating Lens Photoprinter," having R. L. Fowler as author and published in the IBM Technical Disclosure Bulletin, October, 1971, page 1454.

The Ives patent and the Fowler article illustrate scanning systems utilizing wedge scanner elements. However, these systems do not have a collimated light source, such as a laser beam, and differ in many respects from the systems set forth herein.

The Fleischer application is illustrative of a multi-facet scanning system. In such systems, a reflective element has a number of facets of comparable size arranged about the periphery thereof and is rotated during scanning operations. Each facet serves to direct a light beam in a line sweep.

Another patent of interest is the following patent:

U.S. Pat. No. 2,976,361, entitled "Continuous Scanner with Warped Mirror," issued Mar. 21, 1961, and having G. M. Stamps, as inventor.

The Stamps patent is illustrative of another scanning arrangement using a warped or twisted mirror as the line sweep generating element.

SUMMARY OF THE INVENTION

In accordance with the present invention, a number of scanning systems are set forth, each having particular utility in conjunction with a collimated light source, such as a laser beam. The various arrangements are such that a cyclical line sweeping scan is established for tracing successive lines of information on an information source, such as an original document, or the like. The scanning members and the original document, or the like, are relatively moved at the end of each line sweep in order that a new line of information may be traced in a succeeding line sweep. This can be effected by moving the document past the line sweep area, or moving the scanning means in a step by step fashion along the successive line sweep areas of the document. All scanning systems according to the present invention incorporate a wedge scanning element, or specially shaped scanning element operable to direct a laser beam in a line by line fashion to a document in order to derive informational signals of dark and light content by reflection from the document. Various uses can be made of the developed information. In one case, as an example, the information is detected, transmitted to a remote receiver, and used for printing or copying purposes. In another case, the developed information is directed onto a photosensitive surface for local processing in order to prepare a copy of the original document.

In a first version the scanning elements comprise a wedge lens that directs a laser beam, a convex lens, and a cylindrical lens, the arrangement being such that a line of light is projected by simple harmonic motion by rotation of the wedge lens. Another version incorporates a wedge lens associated with two cylindrical lenses that also produce successive sweeping lines of light. In still another version, a shaped prismatic member projects a laser beam in a line of light with a stepped portion providing zero retrace. In contrast with the first and second versions in which the light speed is relatively fast in the center of the line sweep and slower on the ends, this arrangement produces a constant velocity sweep. Another version makes use of a double wedge lens providing two line scans for each rotation thereof and having two stepped areas producing a stepped harmonic motion with zero retrace.

OBJECTS

The primary object of the present invention is to provide scanning systems for producing successive line sweeps of material, such as an original document, in order to derive information during such successive sweeps.

The foregoing and other objects, and features, and advantages of the invention will be apparent from the following more particular description of the preferred embodiments of the invention as illustrated in the accompanying drawings.

DRAWINGS

In the Drawings:

FIGS. 1*a* and 1*b*, when considered together, comprise a communication system for transmitting informational content of an original document to a receiver for printing an output copy, or the like. FIG. 1*c* is intended to be substituted in the place of photosensing elements in FIG. 1*a* and is representative of a photosensitive surface for producing a copy of the original on a local basis.

FIG. 2 illustrates an alternative scheme for sensing informational content of an original document, making use of an elongated light transmission member having an associated photosensor on the end thereof.

FIGS. 3*a*, 3*b*, and 3*c* comprise various scanning systems utilizing a wedge lens element with a circular light transmission pattern as shown in FIG. 3*d*. Simple harmonic motion is achieved with faster scanning in the center of the line and slower scanning at the ends.

FIGS. 4, 5, and 6 illustrate an alternative scanning element comprising a rotating prism especially shaped to achieve a straight line scan with constant velocity.

FIGS. 9*a*–9*d* illustrate scanning motions of the various embodiments of FIGS. 1–8.

DETAILED DESCRIPTION

Scanning Systems — General

FIGS. 1*a*, 1*b*, 1*c*, and 2 illustrate various possible scanning configurations in which the scanning elements illustrated in FIGS. 3–8 find utility.

Figure 1A:
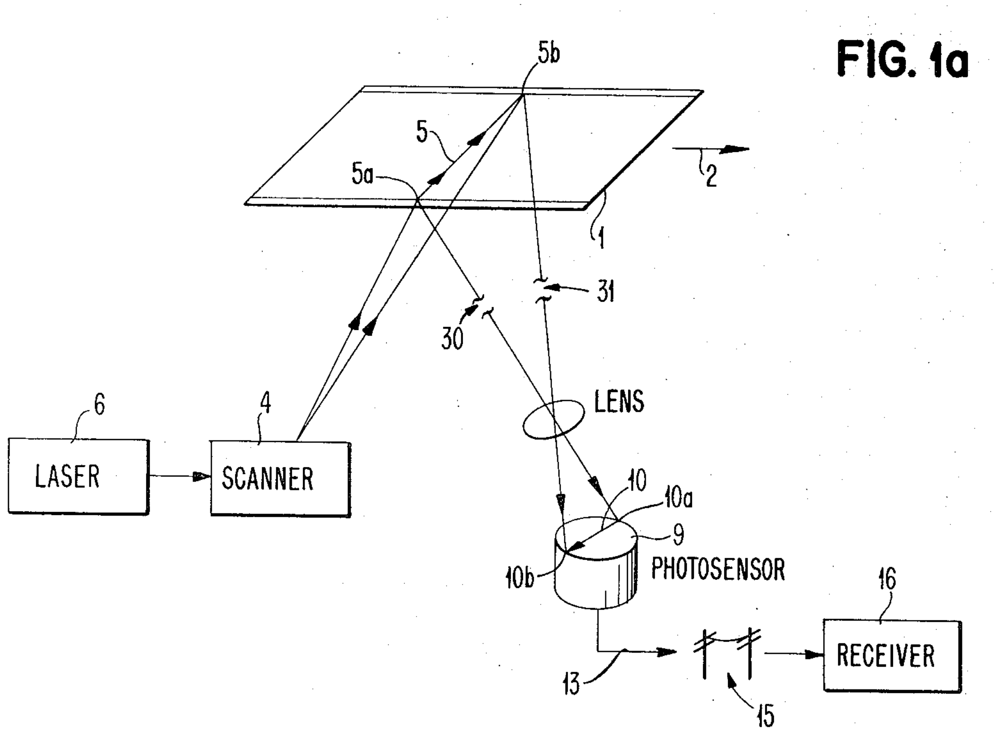

In FIG. 1a an original document 1 is moved, as an example, in a direction indicated by arrow 2. As document 1 is stepped along or moved continuously, a scanner 4 produces a line sweep such as a line sweep at a scanning station represented by line 5 on the underneath surface of document 1. Laser source 6 provides a collimated light beam to scanner 4. A typical sweep extends from point 5*a* to point 5*b* across document 1. Successive scans of the spot light source from scanner 4 occur in this fashion as document 1 moves past the scanning station represented by line 5. Information in the form of light and dark transmissions is reflected by means of a lens 8 to a photosensor 9 as indicated by the line 10. Due to inversion, the line sweep from point 5*a* to point 5*b* moves from point 10*a* to point 10*b*, that is, in the opposite direction. The output of photosensor 9 which can be a photomultiplier tube, as an example, is directed by line 13 for transmission over communication lines 15 to a receiver 16 which can be a printer, copier, or the like.

Figure 1B:
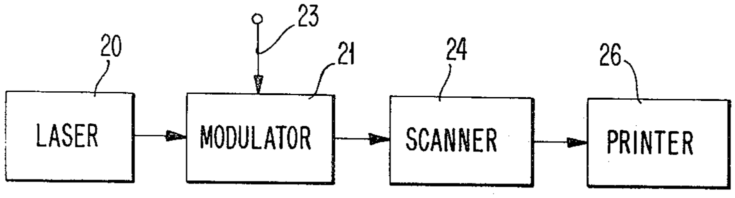

A typical receiving system is represented in FIG. 1*b* as comprising a laser 20, a modulator circuit 21 driven by the incoming signal on line 23, a scanner 24 that moves in a synchronous manner with respect to scanner 4 and a printer 26 serving to produce output copy.

Figure 1C:
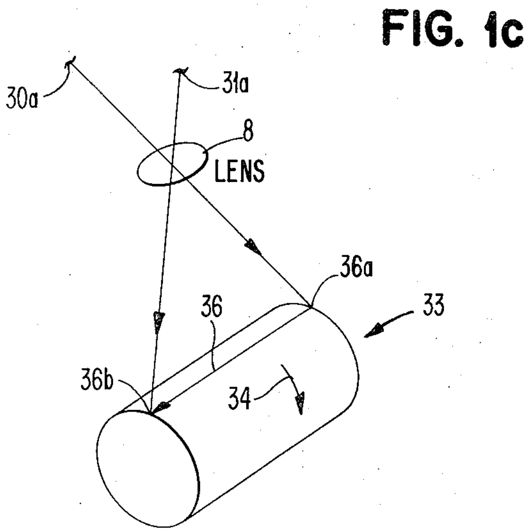

An alternative arrangement is illustrated in FIG. 1c where the structures shown are substituted at points 30 and 31 in FIG. 1*a* in place of various elements such as photosensor 9, by substitution at points 30*a* and 31*a*, respectively. Information reflected from document 1 passes through lens 8 onto a photosensitive member 33, such as a drum having a photoconductor surface. Drum 33 moves as indicated by arrow 34, quite analogous to the movement of document 1 and information is traced on line 36 from point 36*a* to point 36*b* as the spot of light from scanner 4 moves from point 5*a* to point 5*b*, FIG. 1*a*.

Figure 2:
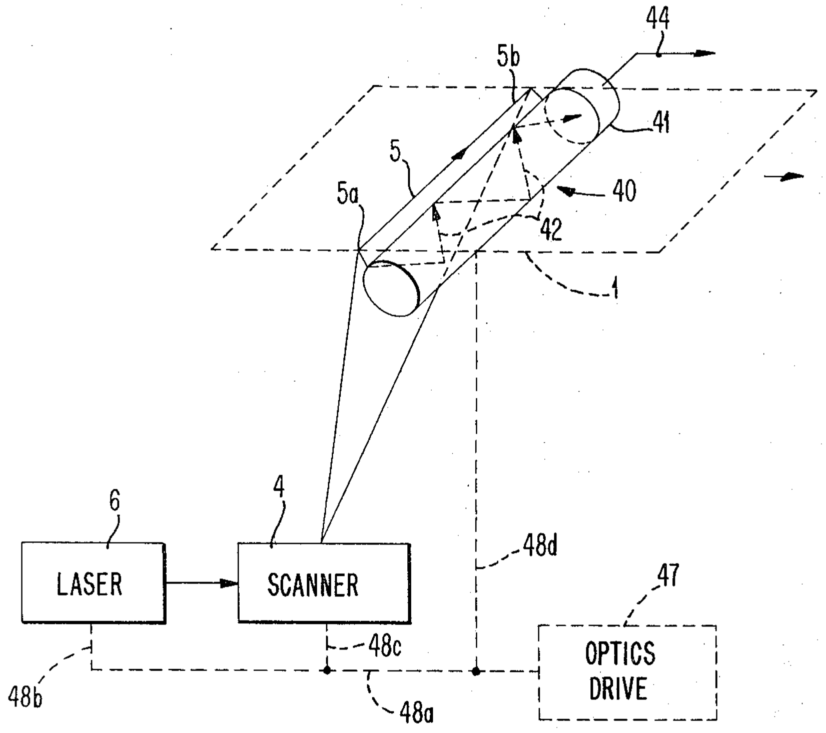

FIG. 2 is a similar system to the scanning systems shown in FIGS. 1*a*, 1*b*, and 1*c* and comparable elements have corresponding reference designations. In this case, information on the underneath side of document 1 is reflected from line 5 into a pickup element 40, comprising a transparent element such as acrylic (painted white on the outside except for the entry slit) and having an associated photosensor 41 positioned at one end thereof. Light reflections from document 1 bounce internally off the pickup tube 40 as indicated by the light paths 42 and are received by photosensor 41 for transmission on line 44.

Also shown in FIG. 2 is an optional optics drive 47 coupled by lines 48*a*–48*d* to the various scanning elements including scanner 4, laser 6, and pickup 40 and associated detector 41 for movement adjacent document 1 in the event it is desired to retain document 1 in a stationary condition as scanning proceeds.

Scanners with Simple Harmonic Motion

Figure 3A:
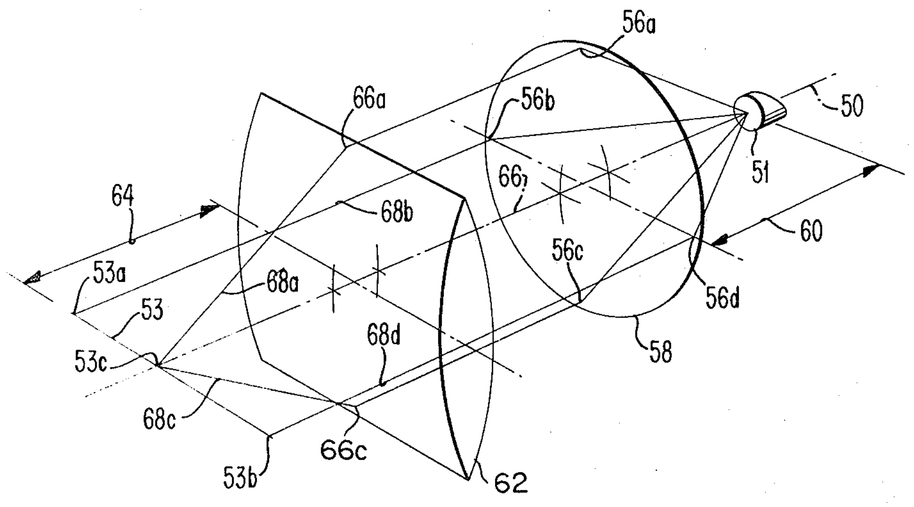
Figure 3B:
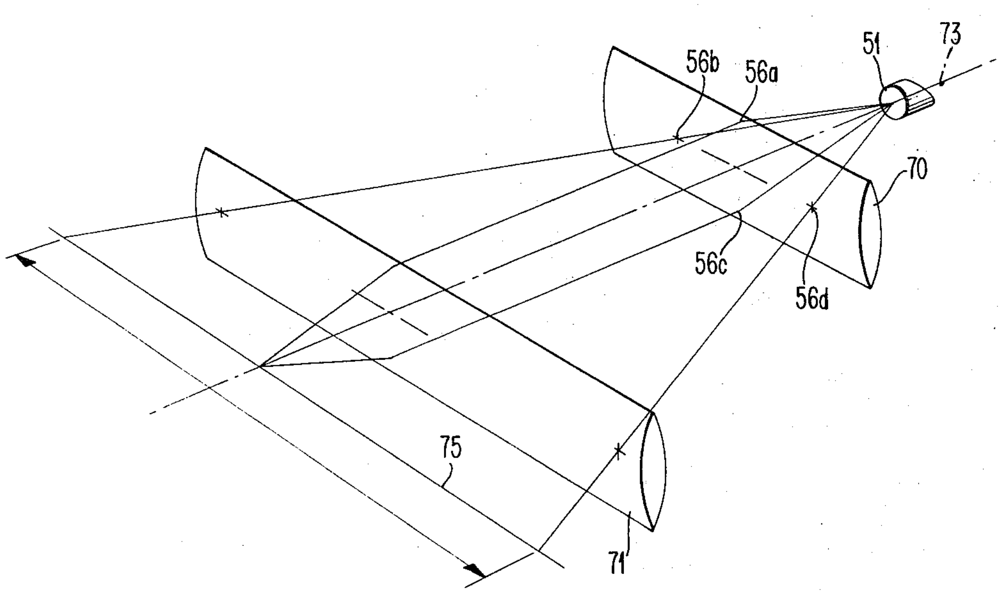
Figure 3C:
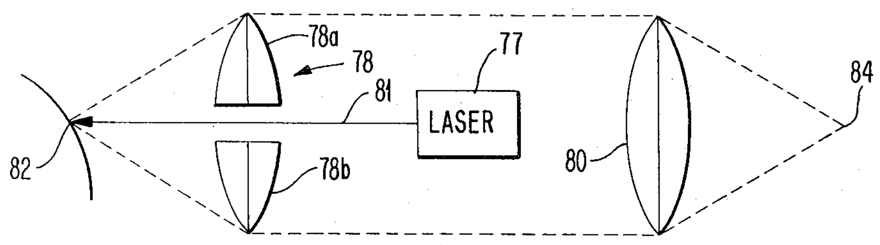

As indicated previously in the "background" section, a typical prior art scanner comprises a mirror having multiple facets thereon. Some difficulty has been encountered heretofore in forming the facets on the mirror with sufficient accuracy to insure that each facet reflects light in essentially the same manner during scanning so that successive lines of information are accurately formed. Several scanning embodiments that eliminate the multifacet difficulties are illustrated in FIGS. 3*a*–3*c* with an associated scanning profile in FIG. 3*d*. The various embodiments in this group produce a simple harmonic straight line scan which is somewhat faster in the center of the line scan and somewhat slower at each end of the line scan. The versions in FIGS. 3*a* and 3*b* utilize a rotating wedge lens passing light from a laser straight through to other scanning elements while the version in FIG. 3*c* utilizes a rotating mirror that reflects light from the laser back to the other scanning elements.

Figure 3D:
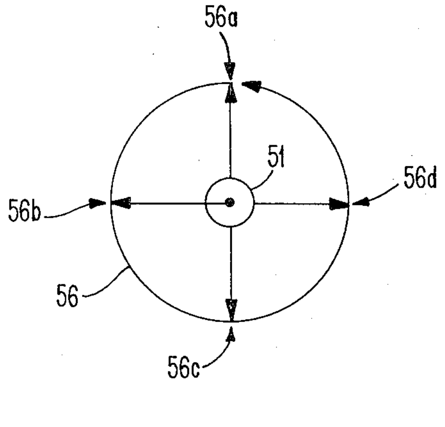

In FIG. 3*a*, light from a laser source, not shown, arrives on line 50 and is directed to wedge lens 51. Ultimately, it is desired to produce a spot of light from scanning along line 53 from point 53*a* to point 53*b*, as an example. The motion produced by wedge element 51 is essentially as shown in FIG. 3*d* along a circular path represented by line 56 starting at point 56*a* and proceeding to points 56*b*, 56*c*, 56*d*, and returning to the starting position at 56*a* during each cycle. Associated with wedge element 51 is a convex lens 58 positioned a predetermined distance from element 51. This distance is the focal length of lens 58 and is represented by the line 60. Points 56*a*–56*d* in FIG. 3*d* are also illustrated in FIG. 3*a*. Positioned beyond lens 58 in the direction of scan a convenient distance, that can be a variable distance, is a straight cylindrical lens 62 with the cross-sectional characteristics shown in FIG. 3*a*. This lens is located a distance represented by line 64 that corresponds to its focal length from the scan line 53. The optical axis of the scanning arrangement is represented as line 66. The arrangement is such that when spots of light are at points 56*a* or 56*c* they are transmitted to points 66*a* and 66*c*, respectively in lens element 62 for focusing onto line 53 as indicated by lines 68*a* and 68*c*, respectively. On the other hand, spots of light at points 56*b* and 56*d* at lens 58 pass straight through along lines 68*b* and 68*d*, respectively, directly to scan line 53 without a change in direction. It is apparent that as the light spot proceeds in the circular path 56, FIG. 3*d*, other points in between the prime points 56*a*–56*d* are transmitted through lens 62 with an appropriate change in direction, as required to achieve a straight line scan along line 53. The arrangement is such that faster scanning of the light spot occurs in the center area of line 53 as at point 53*c*, while a relatively slower rate of scan occurs near the extremities 53*a* and 53*b* of line 53.

The circular convex lens 58 of FIG. 3*a* is replaced by a cylindrical lens 70 in FIG. 3*b* which results in a slightly different scanning action from FIG. 3*b*. Light passing on line 73 from a laser source, not shown, is transmitted from wedge lens 51 in the circular path 56 shown in FIG. 3*d* just as in the arrangement of FIG. 3*a*, and the change in direction when the spot is at points 56*a* and 56*c* occurs in a manner comparable to that described in connection with FIG. 3*a*. However, when it is at 56*b* and 56*d*, the spot of light passes straight through lens 70 and straight through lens 71 without a change in direction. Lens 70 is positioned one focal length away from wedge lens 51 while lens 71 is positioned one focal length away from line 75 and the distance between lenses 70 and 71 is some predetermined distance dependent upon the wedge angle on wedge element 51 and the scan length required along line 75.

In FIG. 3*a*, the diameter of the convex lens 58 of necessity needs to be as large as the longest length of scan whereas, the cylindrical lens 70 of FIG. 3*b* can be much smaller since it can be moved closer to wedge lens 51, thereby offering an advantage. Moving closer (with a corresponding shorter focal length) results in the same diagram as FIG. 3*d* but on a reduced scale. Since the scale is reduced, cylindrical lens 71 of FIG. 3*b* can be smaller in the vertical direction than the cylindrical lens 62 of FIG. 3*a*.

The arrangement in FIG. 3*c* is a variation of the scanning structures of FIGS. 3*a* and 3*b*. This arrangement comprises a laser source 77, a split cylindrical lens 78 comprising an upper portion **78*a* and a lower portion 78*b* and another cylindrical lens 80. Light from laser source 77 is directed as indicated by line 81 to a rotating mirror 82 for re-transmission back through the sections 78*a* and 78*b* of lens 78. Ultimately, the spot of light is focused along a line represented by point 84** that is normal to the plane of the figure in a manner comparable to that described for FIGS. 3*a* and 3*b* and with a rotating circular motion as illustrated in FIG. 3*d*.

Figure 9A:
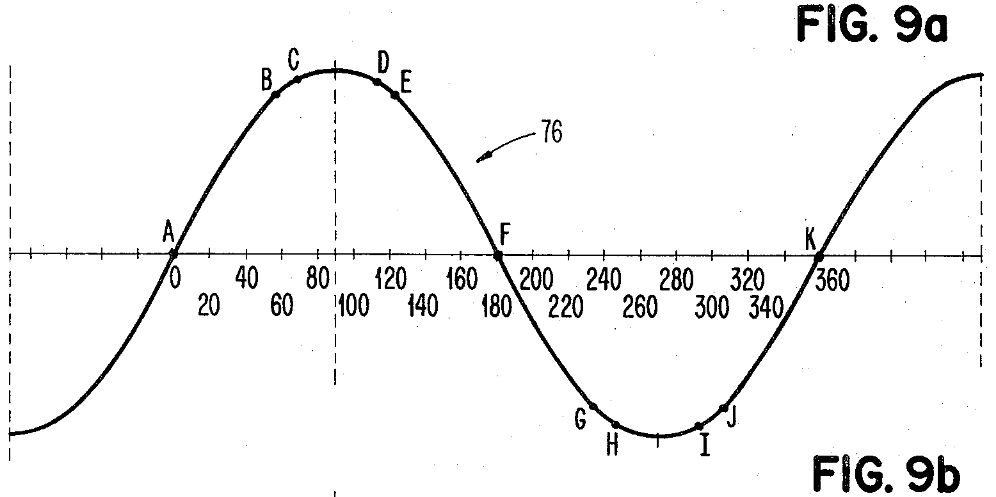
Figure 9B:
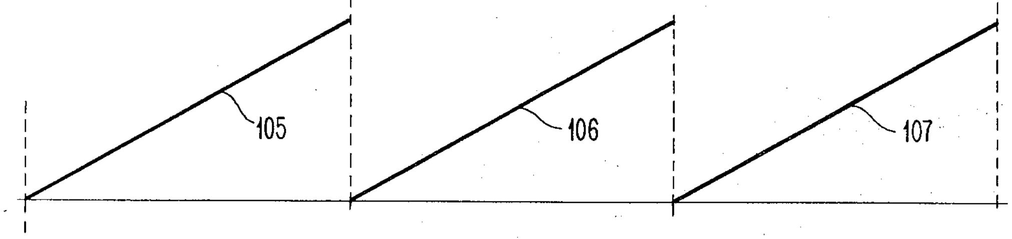
Figure 9C:
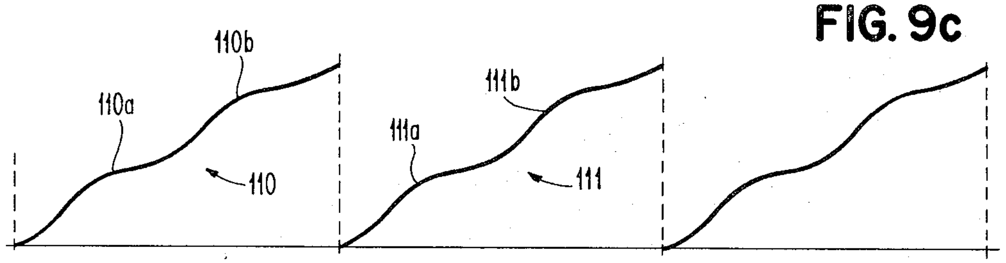
Figure 9D:
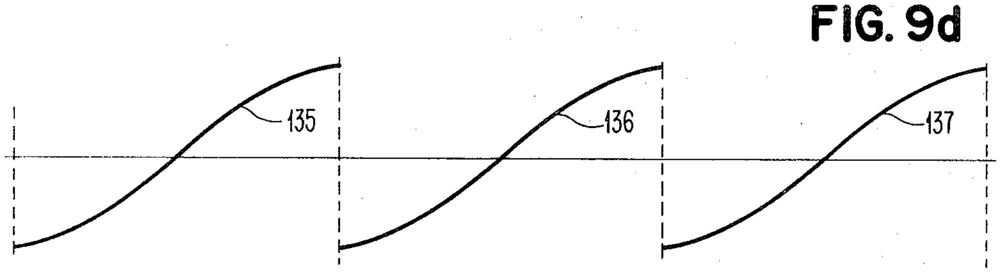

FIG. 9*a* illustrates the scanning action that occurs by using the structures in FIGS. 3*a*–3*c*. The scanning actions of other versions to be discussed shortly, are illustrated in FIGS. 9*b*–9*d*. Referring to FIG. 9*a*, the scan profile is represented as essentially having a sine waveform 76 proceeding from point A to point K. The scan is assumed to start at point A and proceeds to point K with the laser in an on state throughout, with the exception of the periods represented between points C–D and H–I. The speed of scan at points A, F, and K, as an example, may be in the range of 100 inches per second, that is, a relatively fast rate. The speed at points B, E, G, and J drops to some percentage of the maximum rate that is relatively slower, such as 54 inches per second. The slowest rate occurs in the intervals represented by C–D and H–I with the rate at points C, D, H, and I being in the range of 38 inches per second, as an example. Actually, the scan of the light spot from point A to point B represents only half of a scan interval, that is, one half of a scan line. A full scan line is represented by the interval E–G, and another half scan from point J to point K.

Scanning System with Straight Line Constant Velocity Characteristics

Figure 4:
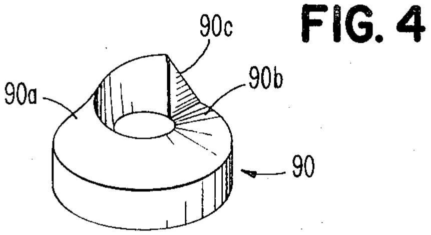
Figure 5:
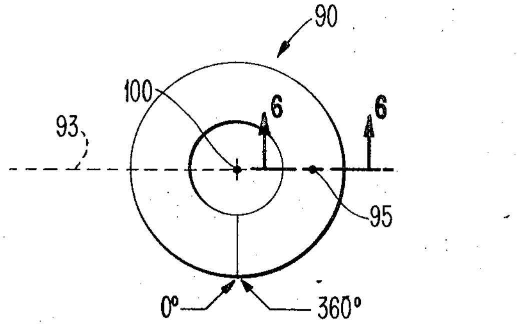
Figure 6:
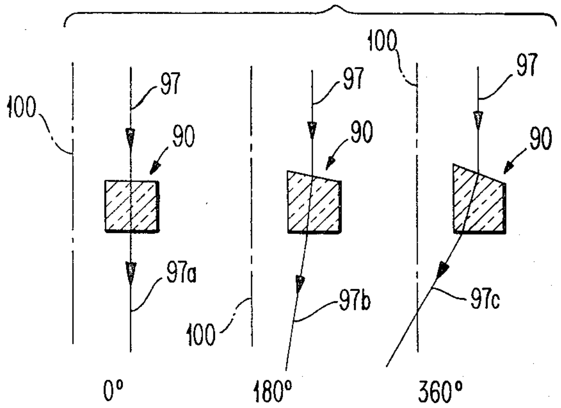

FIGS. 4–7 illustrate an alternative scanning arrangement making use of a spinning prism 90 formed in a predetermined shape to produce a straight line scan with constant velocity in contrast with the straight line scan previously discussed of varying velocity. In FIG. 4, scanning prism 90 comprises a sloping surface **90*a* formed on the face thereof and extending from a low portion 90*b* to a stepped portion 90*c*. FIG. 5 represents an end elevation of element 90 (of FIG. 4) illustrating the spin axis 100, the line of scan 93, and the normally encountered laser beam axis 95. FIG. 6 illustrates refraction and light bending relationships encountered across the section line 6-6 in FIG. 5 as element 90 rotates. A laser beam arrives on line 97 and the axis of rotation of member 90 is indicated at line 100. Three situations are shown, that is the start of a cycle of rotation represented by 0°, half way through at 180°, and at termination represented by 360°. The slope of prism element 90 is such that at 0°, light from the laser source passes straight through indicated by line 97*a*. At 180°, a change in direction occurs represented by line 97*b* while at 360°, a larger change occurs represented by line 97*c*, FIG. 6**.

It is desirable that the laser beam be directed to the outside edge of prism element 90 as it rotates since this results in better control of the beam than if the beam strikes more toward the center or axis area of element 90. The scanning action of element 90 is illustrated in FIG. 9*b* represented by lines 105, 106, and 107. The prime advantage of the element illustrated in FIGS. 4–6 is further shown in FIG. 9*c* in somewhat exaggerated form. Since only one scanning surface is provided extending from **90*b* to 90*c* in FIG. 4**, sucessive line scans will all have an identical scanning representation. Thus in FIG. 9*c* a first line scan 110 having imperfections shown in greatly exaggerated form at **110*a* and 110*b* is followed by a comparable scan 111 having corresponding imperfections at 111*a* and 111*b*. Succeeding line scans will be of comparable shape. Insofar as the final results are concerned in the scanning of information and its transmission, a highly accurate image will be achieved since all scans made by element 90** are essentially identical in shape. Thus, the information is transmitted accurately when the document as a whole is considered.

Figure 7:
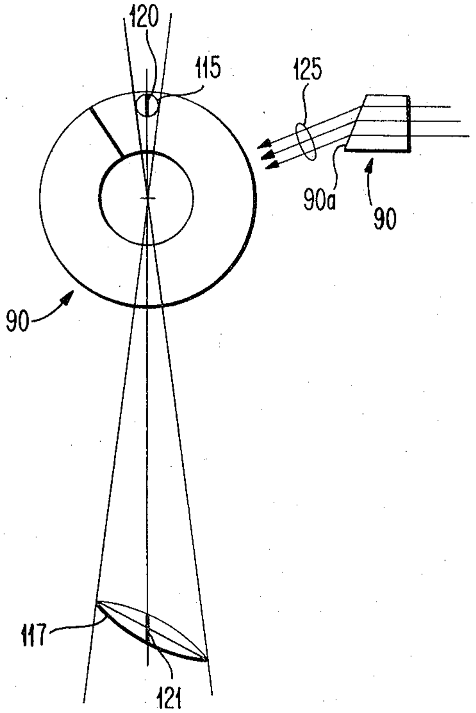
FIG. 7 illustrates a desirable light transmission arrangements for the prism element of FIGS. 4–6.

FIG. 7 illustrates some of the things that need to be considered when using a scanning element having a configuration such as that of the prism 90 just discussed in connection with FIGS. 4–6. If a spot of light, as at 115, is transmitted through element 90, it will result in an elongated spot 117 of a less accurate form. It is desirable that the light from the laser be in the form of a line as indicated by line 120 which when refracted from the surface of element 90 will result in a concentrated line 121 which can then be rendered a circular spot by a cylindrical lens, thence to the ultimate photosensor or receiving surface or the like. The light transmission paths 125 simply illustrate that the laser beam is reflected in the same direction from surface **90*a* of element 90** regardless of how close to the outside edge the light is directed.

Figure 8:
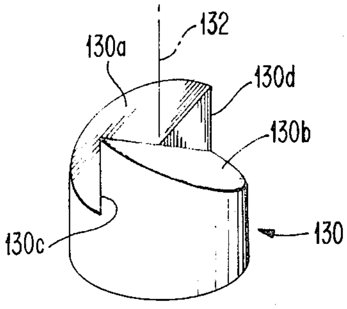
FIG. 8 illustrates a stepped harmonic scanning element for producing two line sweeps in a single cycle of rotation with zero retrace.

Scanning System Using Element with Stepped Harmonic and Zero Retrace Characteristics FIG. 8 illustrates a scanning element 130 having sloped surfaces **130*a* and 130*b*, each with respective stepped portions 130*c* and 130*d*. This element is intended for rotation about an axis 132**. Making use of this element results in a scan pattern illustrated in FIG. 9*d* by lines 135, 136, and 137. It is seen that an essentially zero retrace occurs between successive scans. A laser shining onto element 130 or through it slightly off axis produces a simple harmonic motion straight line scanner with no reverse direction scanning.

While the invention has been particularly shown and described with reference to several embodiments, it will be understood by those skilled in the art that various changes in form and detail (such as replacing the two cylindrical lenses (70 and 71) of FIG. 3b with one cylindrical lens) may be made without departing from the spirit and scope of the invention.

What is claimed is:

1. A scanning system suitable for use with a collimated light source, such as a laser source, and arranged for the production of a succession of line scans of material to be scanned, such as an original document, comprising:

means for activating said collimated light source to produce a collimated light beam;

means supporting a document for scanning at a scan line station;

rotatable scanning means positioned to direct a scanning spot of light to said document, said scanning means having a configuration for progressively changing the direction of said spot of light during rotation of said rotatable element in order to move said spot of light along said scan line at said scan line station, said scanning means comprising a rotatable wedge lens element, a cylindrical lens element positioned between said rotatable wedge lens element and said scan line station and in parallel relation with respect to said scan line station; and an intermediate lens element positioned between said cylindrical lens element and said rotatable wedge lens element one focal length away from said rotatable wedge lens element toward said scan line station, said intermediate lens element directing said collimated light beam along a substantially circular path on the surface of said cylindrical lens element as said wedge lens element is rotated;

means for directing said collimated light beam through said rotatable wedge lens element, said convex lens element and said cylindrical lens element toward said scan line station;

means for relatively moving said document and said scanning means in order to trace a succession of scan lines on said document;

cylically operable means for rotating said wedge lens element, the arrangement being such that a simple harmonic scan of said document is produced with a relatively fast rate of scanning occurring in the center of said scan line station and a relatively slow rate of scan occurring in the end areas of said scan line station;

utilization means for sensing information developed from said document during said successive line scanning operations.

2. The apparatus of claim 1, wherein said utilization means comprises:

photosensor means responsive to light reflections produced during each scanning cycle to develop signals representative of said reflections;

receiver means for producing an output copy; and means interconnecting said photosensor means and said receiver means to control said receiver means in response to signals from said photosensor means.

3. The apparatus of claim 2, further comprising:

a printer for producing printed copy;

printer scanning means operable in timed relation with the cylical operation of said document scanning means; and means for developing signals in said printer scanning means for controlling said printer in accordance with signals developed by said document scanning means during operation.

4. The apparatus of claim 2, wherein said receiver means comprises a photoconductor photoconductive element and associated lens element for receiving signals developed during scanning operations and further comprising:

means for producing a copy of said original document from the image received by said photoconductor element.

5. The apparatus of claim 1 wherein:

said intermediate lens element is a convex lens.

6. The apparatus of claim 1 wherein:

said intermediate lens element is a cylindrical lens.

* * * * *